United States Patent
Lee (10) Patent No.: US 7,515,937 B2
(45) Date of Patent: Apr. 7, 2009

(54) WAFER MOBILE PHONE PLATFORM SYSTEM

(76) Inventor: Joseph C. Lee, 7081 N. Marks Ave., Suite 104283, Fresno, CA (US) 93711

( * ) Notice: Subject to any disclaimer, the term of this patent is extended or adjusted under 35 U.S.C. 154(b) by 331 days.

(21) Appl. No.: 10/670,873

(22) Filed: Sep. 25, 2003

(65) Prior Publication Data
US 2005/0070225 A1 Mar. 31, 2005

(51) Int. Cl.
H04B 1/38 (2006.01)
(52) U.S. Cl. ............ 455/557; 455/558; 455/556.1; 455/41.2; 455/344
(58) Field of Classification Search ......... 455/557–558, 455/556, 414, 569.2, 575.1–575.9, 90.1, 455/41.1–41.3, 344–349, 550.1, 556.1–556.2; 713/320
See application file for complete search history.

(56) References Cited

U.S. PATENT DOCUMENTS

| | | | | |
|---|---|---|---|---|
| 5,594,493 A | * | 1/1997 | Nemirofsky | 725/23 |
| 5,628,055 A | * | 5/1997 | Stein | 455/575.1 |
| 5,802,484 A | * | 9/1998 | Hamilton et al. | 455/558 |
| 5,890,074 A | * | 3/1999 | Rydbeck et al. | 455/558 |
| 5,987,325 A | * | 11/1999 | Tayloe | 455/558 |
| 6,006,109 A | * | 12/1999 | Shin | 455/557 |
| 6,167,251 A | * | 12/2000 | Segal et al. | 455/558 |
| 6,516,204 B1 | * | 2/2003 | Funk et al. | 455/557 |
| 6,529,743 B1 | * | 3/2003 | Thompson et al. | 455/557 |
| 6,587,698 B1 | * | 7/2003 | Dosch | 455/558 |
| 6,845,455 B2 | * | 1/2005 | Kavanaugh et al. | 713/320 |
| 2001/0044321 A1 | * | 11/2001 | Ausems et al. | 455/556 |
| 2002/0016164 A1 | * | 2/2002 | Mead et al. | 455/414 |
| 2003/0125054 A1 | * | 7/2003 | Garcia | 455/558 |
| 2004/0087339 A1 | * | 5/2004 | Goldthwaite et al. | 455/558 |
| 2004/0137964 A1 | * | 7/2004 | Lynch et al. | 455/575.1 |
| 2004/0185777 A1 | * | 9/2004 | Bryson | 455/41.1 |
| 2005/0037709 A1 | * | 2/2005 | Hwang | 455/41.2 |
| 2007/0004372 A1 | * | 1/2007 | Adams et al. | 455/556.1 |

* cited by examiner

Primary Examiner—Lana N Le
(74) Attorney, Agent, or Firm—Richard A. Ryan (57) ABSTRACT

The wafer mobile phone platform system provides a minimalist mobile telephone that can be used alone as a wireless communication device or utilized to transfer its mobile telephone functions from one peripheral device to another. A transceiver unit having telephone circuitry and componentry is mounted on a mobile phone wafer having a battery, memory storage device, display screen and an on/off switch. A short range radio frequency device, such as a Bluetooth or Wi-Fi enabled module, provides short range communication to an earpiece, headset, or other peripheral devices. The wafer can have an antenna, headphone jack and be adapted for use with wired communication devices, such as USB, serial, parallel or firewire cables. The wafer can be attached to or received in a digital camera, video camera, PDA, laptop or desktop computer, GPS unit or other devices to combine the functions of the transceiver unit with the peripheral device.

32 Claims, 4 Drawing Sheets

WAFER MOBILE PHONE PLATFORM SYSTEM

CROSS-REFERENCE TO RELATED APPLICATIONS

None.

BACKGROUND OF THE INVENTION

A. Field of the Invention

The field of the present invention relates generally to communication systems that are configured to transmit sound, data, pictures and other information from one device to another. More particularly, the present invention relates to such systems that are configured to permit wireless communication of such information over a cellular or mobile telephone network. Even more particularly, the present invention relates to such systems that utilize a wafer or card apparatus adapted to connect to a variety of peripheral devices and be utilized with the devices to communicate information over the wireless network.

B. Background

Once not very common or widely available, the use of a cellular or mobile telephone to communicate over a wireless communication network has now become very common. In general, conventional cellular telephones utilize high frequency radio waves to transmit and receive data over the wireless network. Many different companies manufacture mobile telephone devices and/or offer communication services across their wireless network. Although the original mobile telephones were relatively large and very limited in the features they offered, today's mobile telephones are much smaller and include a variety of features that make them more useful than merely as a device for making telephone calls. For instance, mobile telephones in use today frequently have the ability to transmit messages, connect with the Internet, store information for the user and connect to a variety of devices that make the mobile telephone easier and more effective to use. These devices include microphone/speaker systems, charging systems, adapters for use in a vehicle and headphones.

Although the various manufacturers have different features, virtually all mobile phones have certain common characteristics. These include a cellular transceiver unit having appropriate telephone circuitry and componentry, a battery to supply power to the transceiver unit, a multi-key keypad that includes the standard twelve keys and other function keys, on/off switches, a microphone and speaker assembly for transmitting sound, a display panel (typically a LCD panel) for displaying, at a minimum, telephone numbers, and one or more connection ports for connecting to headphones, battery chargers and other such devices. The standard mobile telephone device is adaptable for receiving and operatively interacting with a subscriber identity module (or SIM card) that is provided by the user's cellular telephone network operator. The SIM card stores all of the important information pertaining to the user's wireless telephone account that allows him or her to access the wireless network. With the SIM card configured for the user's own account, he or she may use that Sim card in different manufacturer's mobile telephones and maintain their personalized data, including telephone numbesr and other stored features. In this manner, the manufacturer can manufacture a "generic" mobile telephone that can be utilized with any wireless network provider to communicate across the network system. Although all mobile telephones have the common features described above, most wireless network providers have manufacturers provide mobile telephones that are somewhat customized for use on their own network.

In addition to mobile telephones, many people also utilize a variety of other digital devices, including digital cameras, video cameras, personal digital assistants (PDAs), desktop computer systems, laptop computers, printers and fax machines. With regard to PDAs and laptop computers, it has been found to be particularly advantageous to be able to connect these devices to a wireless communication network so the user may transmit data over the network and to connect to the Internet via that network. Although PDAs and laptop computers are available in relatively smaller sizes and are capable of storing data that includes telephone numbers and the like, they are generally not utilized to make or receive voice communications (i.e., telephone calls). Cameras, video cameras, desktop computers and printers are generally incapable of being used with a wireless communication network. Fax machines, which are typically connected to a land-line telephone network, often have the capability to make telephone calls across the same line used to receive and send faxes. Recently, some manufacturers offer mobile telephones that include or are adaptable for connection to a camera device that allows the user to take a picture or short video clip and transmit the picture or clip over the same wireless network used to transmit telephone calls.

Devices such as computers, PDAs, digital cameras, video cameras, printers and other devices typically connect to each other via cables or wires that transmit electrical signals from one such device to another. Recent development in the area of short distance wireless communication has allowed manufacturers to include mechanisms in their devices that allow like-configured devices to communicate with each other over short range radio frequency (RF). For instance, this technology allows a computer, desktop or laptop, to communicate wirelessly with a PDA, printer, fax machine or other device. With this technology a PDA or laptop can be used to communicate with vending machines, turnstiles, vehicle computer systems and a variety of merchant establishments. This same RF technology is used in mobile telephones to allow the phone to connect to a wireless headset worn by the user while the mobile telephone is in their pocket or located remotely from them (i.e., five to thirty feet away). This wireless RF system can also be used in small wireless local area network (LAN) systems, also known as piconets, where all of the RF-enabled devices within the piconet communicate with a master device (i.e., desktop computer) and/or other devices in the piconet.

Naturally, a variety of wireless digital or analog interfaces or connection systems are available for wirelessly interconnecting different devices together. One type of such wireless communication is the use of infrared (IR) transmitters and receivers. These are of limited acceptability, however, due to directional and visual problems that are known to exist with IR systems. Until relatively recently, the most common configuration for short range RF systems has been the IEEE 802.11 (or Wi-Fi) based radio frequency standard. More recently, the communications industry has developed Bluetooth, a trademark owned by Bluetooth SIG, Inc., as a new wireless technology standard that utilizes the unlicensed 2.4 Ghz radio spectrum (i.e., not licensed by the United States' applicable governmental regulating authority, the Federal Communications Commission or FCC). In a relatively short period of time, the Bluetooth standard for wireless piconet networks has become very well known. Information about Bluetooth is available from many different sources, including from the Internet at www.bluetooth.com. In general, the Bluetooth network technology is an open, worldwide specification for wireless communication of data and voice that is based on a low-cost, short-range radio link that allows wireless communication over a typical range of up to 100 feet. Bluetooth has been incorporated into a variety of devices for various uses, including the interface between mobile telephones and wireless headsets.

Although the present state of wireless communication is vastly improved over what has been available, there remains certain important limitations that prevent easy and efficient use of the various mobile phones and digital peripheral devices. For instance, when a person desires to upgrade their mobile phone to take advantage of new features offered by a new phone, he or she must replace the entire phone. Even though many of the mobile phone's components are still functional and suitable for use, only the SIM card is actually transferred to the new mobile phone. The rest of the phone is recycled or sent to disposal. Another limitation is that mobile phones do not directly interact with many peripheral devices where such interaction would be highly beneficial. For instance, mobile phones do not interact directly with high quality digital cameras or digital video cameras. While some mobile phones have a camera or attach to a camera, these cameras are of the low quality (i.e., typically less than 1 pixel) that are not highly desired for photographs one would wish to develop into a printed picture or use in a newspaper, magazine or other text. If a high quality mobile phone adaptable camera became available, it is likely that the new camera would not be readily transferable to the user's current mobile phone, thereby forcing the user to purchase a new mobile phone when it was not necessary. In addition, it would be beneficial if the mobile phone could be added to the user's high quality camera or video camera, which was selected by the user based the photographic qualities desired by the user. It would also be beneficial to connect a mobile phone with a PDA, laptop or desktop computer to transfer data, such as telephone numbers, to the mobile phone so telephone calls can be made to those numbers. In addition to having functional benefits, being able to selectively combine a mobile phone with a peripheral device has the practical effect of reducing the amount of equipment a person must carry and deal with. What is needed, therefore, is a system that allows the user to move his or her mobile phone from one peripheral device, including a cellular telephone body, to another such that the mobile phone is incorporated into the peripheral device to function therewith. Such a system should allow the user to use the mobile phone alone as a minimalist phone or in combination with a peripheral device to operate the mobile phone through the peripheral device to send voice or data across a wireless network.

SUMMARY OF THE INVENTION

The wafer mobile phone platform system of the present invention provides the benefits and solves the problems identified above. That is to say, the present invention discloses a wafer mobile phone platform system that is useful as a stand alone mobile phone device or suitable for connection to a peripheral device to function with the peripheral device. For instance, the user of the wafer mobile phone platform of the present invention can use the present apparatus alone as a minimalist phone or incorporate the apparatus into a peripheral device to use the peripheral device as a mobile phone. Using the system of the present invention, the user can place the mobile phone wafer into a cellular telephone body and use it as a telephone. When it is desired to replace the cellular telephone body, due to damage or the desire to upgrade to new features, the user merely has to purchase the base telephone body and place his or her mobile phone wafer into it to have a ready-to-go new phone. Likewise, if the user wishes to use a high quality digital camera or video camera, he or she can combine the mobile phone wafer with the camera to take pictures and then send them to another device across a wireless network and, at the same time, be able to answer or make telephone calls with the mobile phone (as it remains attached to the camera). As desired or needed, the user can then use the mobile phone wafer with a video camera, PDA, laptop computer or a variety of other known or future peripheral devices. As with the cellular telephone body, the user can upgrade the peripheral device, such as buying a new camera, when desired or needed without affecting his or her mobile phone wafer. In this manner, the mobile phone can be effectively incorporated into a variety of peripheral devices that can be replaced or upgraded without having to have multiple telephone devices or affect the users mobile phone usage.

In one aspect of the wafer mobile phone platform system of the present invention, the system primarily comprises a mobile phone wafer that is adaptable for selectively connecting to a plurality of peripheral devices to allow the user to use the peripheral devices to make and receive telephone calls and send and receive data or voice communications over a wireless communication network, such as a cellular or satellite system. A transceiver unit, having standard or conventional telephone circuitry and componentry which is suitable for connection to the wireless communication network in order to send and receive voice and data communications thereby, is mounted on or incorporated within the mobile phone wafer. A source of electrical power, such as a rechargeable battery, is also mounted on the mobile phone wafer to supply electrical power to the transceiver unit. A communication device on the mobile phone wafer is configured to transmit voice and data communications between the transceiver unit and the plurality of peripheral devices. A display screen on the mobile phone wafer is operatively coupled with the transceiver unit to display incoming/outgoing call information, battery power levels and signal strength. An antenna is coupled to the transceiver unit to facilitate communication with the wireless communication network. With the wafer mobile phone platform system of the present invention, the user can selectively and operatively connect the mobile phone wafer to any one of the plurality of peripheral devices so as to interface the transceiver unit with the peripheral device to allow the user to utilize the peripheral device for wireless voice and data communication. In a preferred embodiment, the mobile phone wafer further comprises an on/off switch and a standard headphone jack. Peripheral devices suitable for use with the wafer mobile phone platform system of the present invention include, but are not limited to, cellular phones, earpieces, headsets, laptop computers, desktop computers, digital cameras, video cameras, PDAs, printers, tape recorders, cordless telephones, game/message consoles, vehicle systems and GPS units.

In a preferred embodiment, the communication device on the mobile phone wafer is configured to cooperatively communicate with an individual reception device, such as an earpiece or headset, that is configured to allow the user to interface with the transceiver by voice communication so as to make and receive telephone calls without having to contact the mobile phone wafer. One peripheral device particularly suited for the present invention is a cellular phone comprising a phone body having a standard twelve key keypad, one or more function keys and a display panel. This allows the user to use the mobile phone wafer as a standard cellular phone and then remove the wafer from the cellular phone body to use with another peripheral device. The communication device can be a short range radio frequency transceiver, such as a Bluetooth and/or Wi-Fi module. The system can also be configured to work with wired connections, such as USB, serial, parallel or firewire connections, to the peripheral devices.

Accordingly, the primary objective of the present invention is to provide a wafer mobile phone platform system that provides the advantages described herein and that overcomes the disadvantages and/or limitations associated with presently available systems and methods.

It is also an important objective of the present invention to provide a wafer mobile phone platform system that allows the user to utilize a mobile phone wafer as an easy to carry and use minimalist mobile phone.

It is also an important objective of the present invention to provide a wafer mobile phone platform system that provides a mobile phone wafer adaptable for connection to and functional operation with a variety of peripheral devices, including earpieces, cameras, computers, PDAs, printers, audio devices and cellular telephone bodies, such that telephone calls can be made and answered with the device and voice or data from the device can be transmitted across a wireless communication network.

It is also an important objective of the present invention to provide a wafer mobile phone platform system that incorporates short range RF communication, such as Bluetooth and/or WiFi, to transmit voice and data between a mobile phone wafer and one or more peripheral devices.

It is also an important objective of the present invention to provide a wafer mobile phone platform system that utilizes a mobile phone wafer having at least a transceiver unit incorporating telephone circuitry and componentry, a source of electrical power, a display screen and an antenna configured to interconnect the transceiver unit with a wireless communication network.

It is also an important objective of the present invention to provide a wafer mobile phone platform system that has a mobile phone wafer that wirelessly connects with an earpiece or headset that includes a microphone configured to allow the user to make and receive telephone calls without touching the mobile phone wafer.

The above and other objectives of the present invention are explained in greater detail by reference to the attached figures and the description of the preferred embodiment which follows. As set forth herein, the present invention resides in the novel features of form, construction, mode of operation and combination of processes presently described and understood by the claims.

BRIEF DESCRIPTION OF THE DRAWINGS

In the drawings which illustrate the best modes presently contemplated for carrying out the present invention.

DETAILED DESCRIPTION OF THE PREFERRED EMBODIMENTS

With reference to the figures where like elements have been given like numerical designations to facilitate the reader's understanding of the present invention, and particularly with reference to the embodiments of the present invention illustrated in the figures, the preferred embodiments of the present invention are set forth below. The enclosed figures and drawings are merely illustrative of the preferred embodiments and represent several different ways of configuring the present invention. Although specific components, materials, configurations and uses of the present invention are illustrated and set forth in this disclosure, it should be understood that a number of variations to the components and to the configuration of those components described herein and in the accompanying figures can be made without changing the scope and function of the invention set forth herein.

Figure 1:
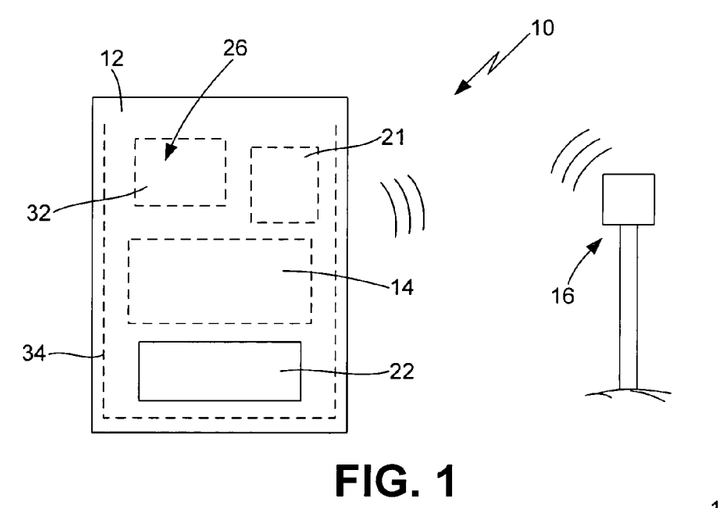
FIG. 1 is a front view of a mobile phone wafer for use with a preferred embodiment of the wafer mobile phone platform system of the present invention.

A preferred embodiment of the wafer mobile phone platform of the present invention, identified generally as 10 in the figures primarily comprises a mobile phone wafer 12 on which is mounted or incorporated within a transceiver unit 14, which could be cellular or satellite enabled, having conventional telephone circuitry and componentry, all of which is common and well known in the art, that is suitable for wireless connection with a typical wireless communication network 16, as shown generally in FIG. 1. As is known in the art, transceiver unit 14 is adaptable for transmitting voice and data over the wireless communication network 16. Transceiver unit 14 is attached to or imbedded within mobile phone wafer 12 such that they are essentially an integral unit. Mobile phone wafer 12 can be made out of various plastics, composites and other materials suitable for use as a base for transceiver unit 14 and the other components described in more detail below. Preferably, mobile phone wafer 12 is shaped and configured to be a relatively small device that can be used alone as a small cellular telephone or selectively attached to a peripheral device 18, such as those described herein with regard to FIGS. 3 through 9, to accomplish the objectives of the present invention.

Figure 2:
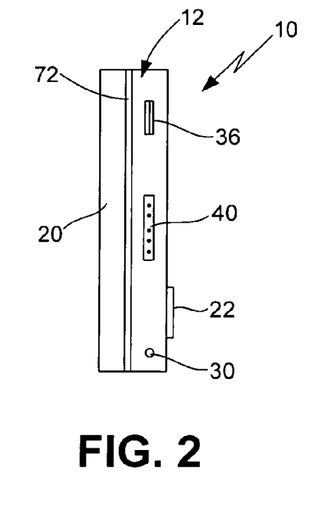
FIG. 2 is a side view of the mobile phone wafer of FIG. 1.
Figure 3:
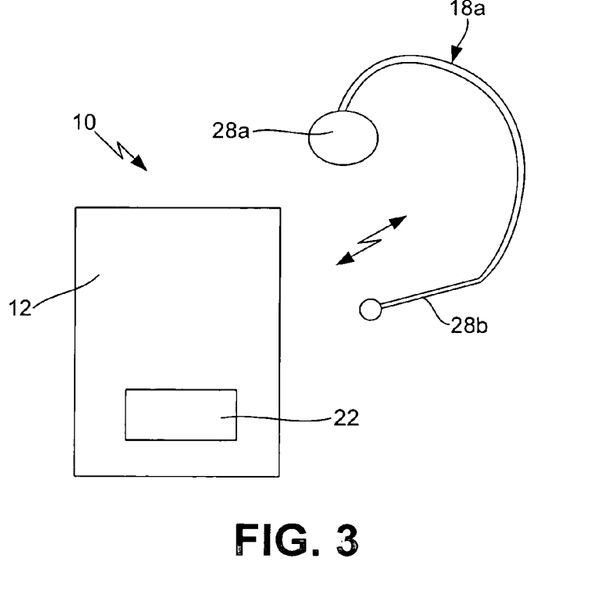
FIG. 3 is a view of the mobile phone wafer of FIG. 1 in use with an earpiece device.

In one embodiment of the wafer mobile phone platform system 10 of the present invention, shown in FIGS. 1 and 2, mobile phone wafer 12 includes a source of electrical power 20, a memory storage device 21, a display screen 22, an on/off switch 24 and one or more communication devices 26 suitable for connecting transceiver unit 14 with an individual reception device 18a, having speaker/microphone capability, such as the earpiece shown in FIG. 3 with speaker 28a and microphone 28b, or a conventional over-the-head headset having a speaker and a microphone. The source of electric power 20 will typically be a rechargeable battery such as those commonly used in conventional cellular telephones and other electronic devices. Memory storage device 21 can be one of any commonly available memory devices, such as computer chips, for storing a quantity of information, including names and phone numbers, to be accessed by transceiver unit 14. Display screen 22 will typically be a LCD display, for displaying incoming and outgoing phone numbers and other information pertinent and desired by the user (i.e., time, date, battery power level and/or signal strength for transceiver unit 14). Such display screens 22 are well known and commonly utilized in the communications and electronics industries. On/off switch 24 is operatively connected to transceiver unit 14 to allow the user to turn wafer mobile phone platform on and off as desired. The communication device 26 can include a headphone jack 30, such as the 2.5 mm headphone jack receptor commonly used in conventional cellular telephones, CD players and other devices, for connection to a headset having a speaker and microphone. Communication device 26 can comprise a wireless piconet device 32, such as a Wi-Fi or Bluetooth enabled device that provides short range RF communication ability. In the preferred embodiment of the wafer mobile phone platform 10 of the present invention, mobile phone wafer 12 includes both headphone jack 30 and a Bluetooth enabled wireless piconet device 32 for connection to a wired or wireless speaker/microphone apparatus 18a and other peripheral devices 18. Although a number of different communication devices 26 are adaptable for use with wafer mobile phone platform 10 of the present invention, at the present time the Bluetooth technology appears to be the most universally adaptable standard for short range RF devices. Although it is anticipated that other technology may add to or replace the Bluetooth standard sometime in the future, it is likely that this new technology will also be adaptable to the wafer mobile phone platform 10 of the present invention. For instance, a recent improvement that would be useful with the wafer mobile phone platform 10 of the present invention is the Wanda (for wireless any network digital assistant) chip concept from Texas Instruments that integrates cellular GSM/GPRS, Wi-Fi and Bluetooth technologies to enable simultaneous phone calls, web browsing, mobile commerce and Bluetooth-enabled capabilities.

Wafer mobile phone platform 10 can also include an antenna 34, which can be in the nature of a typical rod-like antenna that can be configured to be telescopically attached to wafer 12, an antennal chip imbedded on wafer 12 or an integrated antenna (as shown on FIG. 1). Other antenna devices known in the art are likely to also likely to be sufficient as antenna 34 for wafer mobile phone platform 10. Antenna 34 is operatively connected to transceiver unit 14 to facilitate an improved wireless connection with wireless communication network 16. Mobile phone wafer 12 can also include a universal serial bus (USB) connector 36, shown as a female port in FIG. 2, to permit connection with peripheral devices 18 or to recharge battery 20 by use of a USB cable 38 (shown in FIG. 6). USB connector 36 allows the wafer mobile phone platform 10 to connect to and exchange voice and data with peripheral devices 18 that do not have a wireless piconet device 32 configured therewith (i.e., not Bluetooth enabled). If desired, mobile phone wafer 12 can also include a serial or parallel port connector 40 to allow connection across a serial or parallel cable 42 (shown in FIG. 7) with peripheral devices 18, such as some older desktop or laptop computers, that do not have USB connectors. In yet another alternative, communication device 26 can be suitable for use with firewire cable or a variety of other types of connectors commonly available in the electronic industry.

A number of peripheral devices 18 are suitable for use with the wafer mobile phone platform 10 of the present invention. For instance, mobile phone wafer 12 can be configured to attach to cellular phone 18b having phone body 60, shown in FIGS. 4 and 5, with a standard twelve key keypad 62, other function buttons or keys 64 and a display panel 66, typically a LCD display. In one embodiment, shown in FIG. 5, phone body 60 can be configured such that mobile phone wafer 12 securely fits into a cavity 68 on the back of phone body 60 by engaging tabs 70 into a slot or groove 72 (shown on FIG. 2) on mobile phone wafer 12. A male-configured USB connector 74 can be configured to engage the female-configured USB port 36 on mobile phone wafer 12 to facilitate the transfer of voice and data between mobile phone wafer 12 and cellular phone 18b. The user engages connector 74 into port 36 when he or she slides mobile phone wafer 12 into cavity 68. Alternatively, cellular phone 18b can utilize a short range RF device, such as Bluetooth and/or WiFi, similar to that described above to transfer voice and data between the two devices. In one configuration, cellular phone 18b includes the standard microphone/speaker assemblies and display functions utilized by display panel 66 such that once mobile phone wafer 12 is engaged with cellular phone 18b, the combined device functions much the same as a conventional cellular telephone device. As known to those skilled in the art, the voice and data from mobile phone wafer 12 is transmitted to cellular phone 18b where it is further processed to be heard or read by the user. As desired by the manufacturer or user, mobile phone wafer 12 can be attached or mounted on cellular phone 18b such that display screen 22 of mobile phone wafer 12 faces inward, where it is not seen by the user, or facing outward from the back of cellular phone 18b such that the user can read the information on display screen 22 as well as display panel 66.

Figure 4:
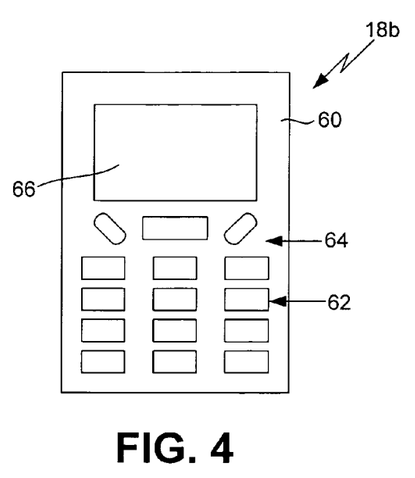
FIG. 4 is a front view of a cellular phone body configured for use with the mobile phone wafer of FIG. 1.
Figure 5:
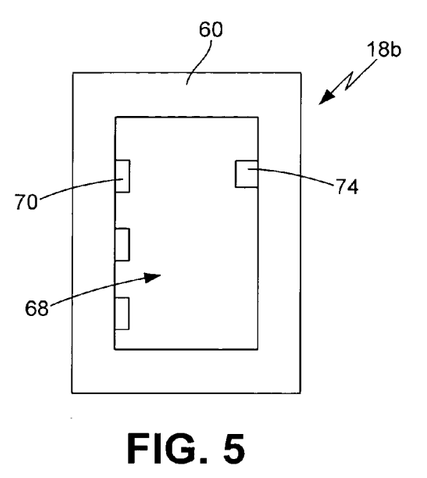
FIG. 5 is a back view of the cellular phone body of FIG. 4.

As a single unit, the user would not notice much if any difference between a conventional cellular telephone and cellular phone 18b having mobile phone wafer 12 engaged therewith. Because the relatively expensive telephone components, such as transceiver unit 14, are on mobile phone wafer 12, when the user desires to upgrade or replace cellular phone 18b he or she will be able to do so for less cost than if these components were fixedly included with cellular phone 18b, as with the prior art devices. Manufacturers of cellular phone 18b can incorporate whatever features they believe their consumers will desire, including the selection and manipulation of the voice and data from mobile phone wafer 12 and the physical characteristics of cellular phone 18b, without having to provide the more expensive transceiver unit 14 and other components of mobile phone wafer 12.

Figure 6:
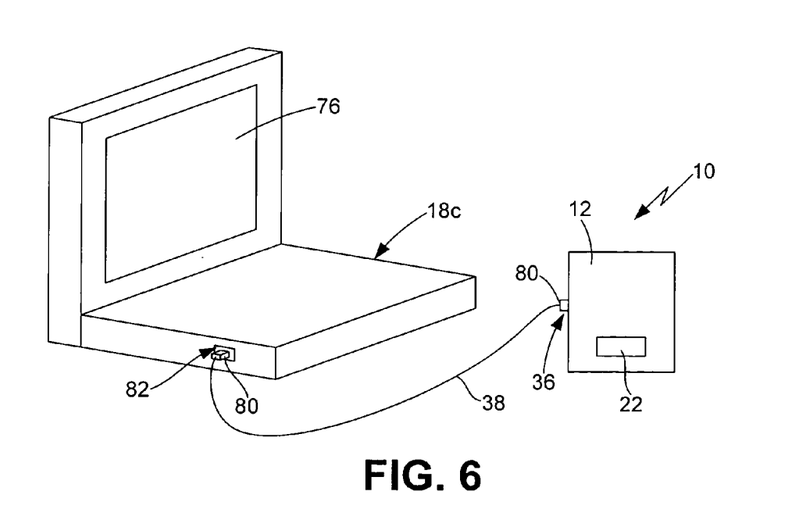
FIG. 6 is an isometric view of a laptop computer configured for use with the mobile phone wafer of the present invention shown in FIG. 1.

As shown in FIG. 6, peripheral device 18 can be a conventional laptop computer 18c having a laptop screen 76 for displaying information from the computer 18c itself and the connected mobile phone wafer 12. As discussed above, short range RF communications, such as Bluetooth or Wi-Fi, can be utilized to communicate between wafer mobile phone platform 10 and laptop computer 18c. Alternatively, as shown in FIG. 6, a USB cable 38 having male-configured USB connectors 80 at both ends can interconnect laptop USB port 82 with the USB port 36 on mobile phone wafer 12. USB communications, well known in the art, allow rapid transfer of voice and data communications between different devices. Naturally, either mobile phone wafer 12 or laptop 18c can be configured with a male-configured USB connector (as shown as 74 in FIG. 5) with USB cable 38 configured with one or more female USB ports. Other buses, which typically have a source of power within the bus, may also be used to interconnect mobile phone wafer 12 with laptop 18c. Either mobile phone wafer 12 or laptop 18c can be configured with connectors that allow mobile phone wafer 12 to be joined to laptop 18c or laptop 18c can be configured with a cavity, open bay or other configuration that allows mobile phone wafer 12 to be inserted or otherwise physically incorporated into the shell of laptop 18c so the two devices essentially become a single integral unit.

However the two devices are joined, the use of wafer mobile phone platform 10 with laptop 18c allows voice and data to be transferred to and from laptop 18c and/or mobile phone wafer 12. The user can utilize laptop computer 18*c* when he or she wants to make or answer a wireless telephone call. For instance, the user can utilize a contact information spreadsheet or database in laptop computer 18*c* to look up and automatically dial a phone number across wireless communication network 16. In addition, information such as e-mail, text messages and other wireless communications can be transmitted from mobile phone wafer 12 and read on laptop screen 76. If desired, particularly in the configuration where mobile phone wafer 12 is incorporated into laptop computer 18*c*, the telephone call can be routed through the laptop computer 18*c* such that the speakers and microphone on laptop computer 18*c* are utilized for the telephone call. Laptop computer 18*c* can also be utilized to change the operational characteristics of transceiver unit 14 and/or those of cellular phone 18*b* when mobile phone wafer 12 is removed from laptop computer 18*c* and placed in phone body 60. If desired, electrical power can be transmitted from laptop computer 18*c* to mobile phone wafer 12 to operate transceiver unit 14 and the other components or to recharge battery 20. Particularly in case of emergency, this provides the user with an additional mechanism to recharge battery 20 of mobile phone wafer 12.

Figure 7:
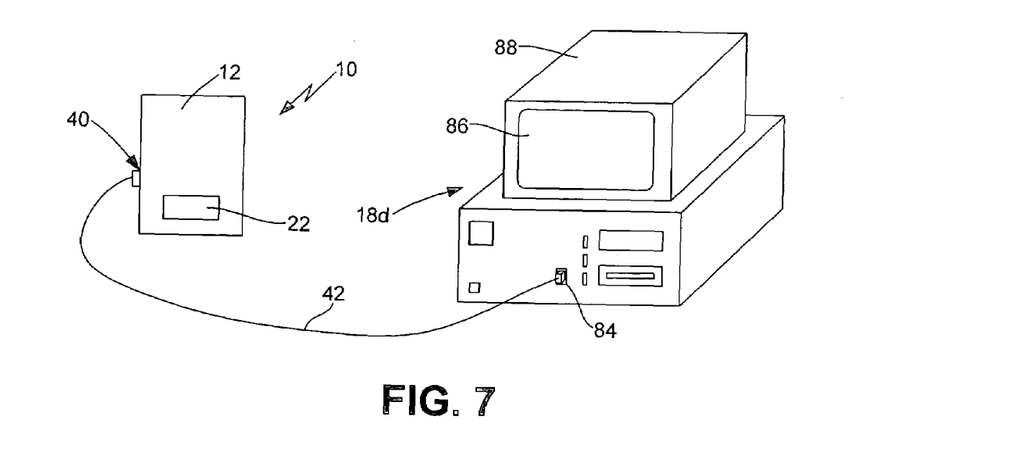
FIG. 7 is an isometric view of a desktop computer configured for use with the mobile phone wafer of the present invention shown in FIG. 1.

Wafer mobile phone platform system 10 of the present invention can also be utilized with desktop computer 18*d*, shown in FIG. 7 using serial cable 42 to interconnect serial port 40 on mobile phone wafer 12 with a serial port 84 on desktop computer 18*d*. Alternatively, cable 42 can be a parallel-configured cable that interconnects a parallel port on mobile phone wafer 12 with a parallel port on desktop computer 18*d*. As described above with regard to the other embodiments, both mobile phone wafer 12 and desktop computer 18*d* can be configured to interconnect by other wired connections, such as a USB cable, or by wireless short range RF transmission, such as Bluetooth or Wi-Fi. As with laptop computer 18*c*, voice and data can be exchanged between mobile phone wafer 12 and desktop computer 18*d* and, as desired, displayed on monitor screen 86 of computer monitor 88. Either mobile phone wafer 12 or desktop computer 18*d* can be configured with connectors that allow mobile phone wafer 12 to be joined to desktop computer 18*d* or desktop computer 18*d* can be configured with a cavity, open bay or other configuration that allows mobile phone wafer 12 to be inserted into or otewise physically incorporated into the shell of desktop computer 18*d* so the two essentially become a single integral unit. Once connected, whether physically or wirelessly, voice and data communications can be exchanged between the two devices, allowing data in mobile phone wafer 12 to be updated or changed and desktop computer 18*d* to be utilized to answer a telephone call, e-mail or text messaging that was transmitted over wireless communication network 16.

Figure 8:
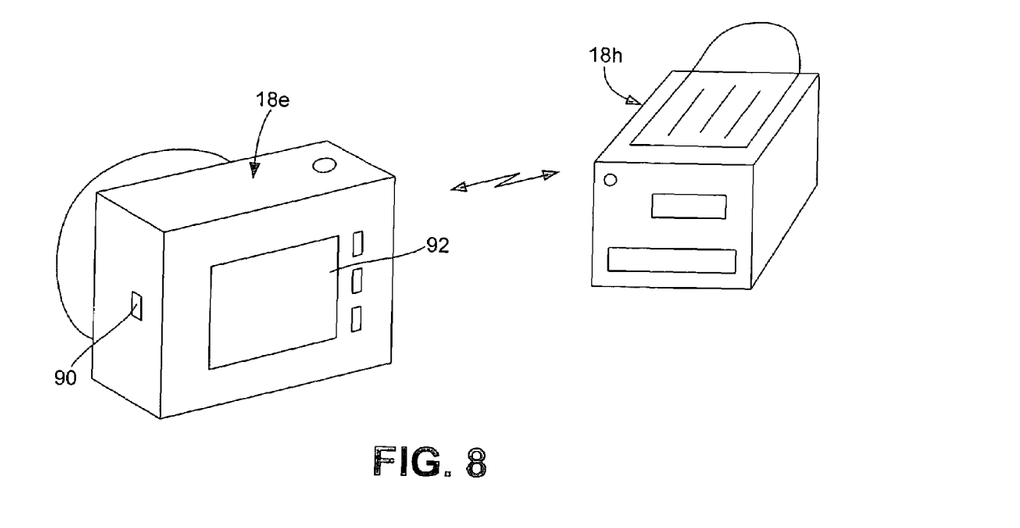
FIG. 8 is an isometric view of a digital camera configured for use with the mobile phone wafer of the present invention shown in FIG. 1.

As shown in FIG. 8, wafer mobile phone platform system 10 of the present invention can be utilized with a digital camera, shown as 18*e*, to selectively combine the features of a wireless telephone with digital camera 18*e*. In this configuration, mobile phone wafer 12 can attach or connect, with wired or wireless connection, to digital camera 18*e*. In a preferred embodiment, digital camera 18*e* is a high quality digital camera that is adapted to receive mobile phone wafer 12 therein or to connect to it via a USB cable, firewire cable, serial cable, parallel cable or short range RF device, such as Bluetooth or Wi-Fi. In the configuration shown in FIG. 8, digital camera 18*e* has a USB port 90 to connect to mobile phone wafer 12. In a preferred embodiment, mobile phone wafer 12 can slide into digital camera 18*e*, essentially making it a "cellular camera," as with the other peripheral devices 18, and connect thereto. With mobile phone wafer being Bluetooth enabled, the user can wear earphone 18*a* and, by touching the earphone 18*a*, answer or make a wireless telephone call through the digital camera 18*e* to wireless communication network 16. Mobile phone wafer 12 would interact with digital camera 18*e* such that the user could use camera screen 92 to access the database stored on memory storage device 21 on mobile phone wafer 12. With a speaker incorporated into digital camera 18*e*, the user could use digital camera 18*e* as a cellular speaker phone. After taking pictures with digital camera 18*e*, the user can then send the high quality digital pictures to anyplace in the world, virtually instantly. The Bluetooth or Wi-Fi capability of mobile phone wafer 12 would allow the user to interface digital camera 18*e* with any network within range, thereby allowing the "cellular camera" to interface with another peripheral device, such as laptop computer 18*c*, desktop computer 18*d* or other devices (as described below). One useful device would be a printer, shown as 18*h* on FIG. 8, to allow the user to instantly and wirelessly print photographs taken with digital camera 18*e*.

In addition to the wired or wireless earpiece or headset 18*a*, cellular phone 18*b*, laptop computer 18*c*, desktop computer 18*d* and digital camera 18*e* discussed above, the wafer mobile phone platform system 10 of the present invention can be used with and incorporated into a number of other peripheral devices, as shown in FIG. 8. For instance, mobile phone wafer 12 can be configured to communicate, in wired and/or wireless mode, to a digital video camera 18*f* in much the same way as set forth above with regard to digital camera 18*e* except that it could transmit both digital photographs and video across wireless communication network 16. As described above, mobile phone wafer 12 could be received in or attached to video camera 18*f* to use it as telephone or to transmit video to other peripheral devices 18. Use of wafer mobile phone platform 10 in this manner facilitates virtually anyone being able to quickly and easily set-up and conduct video conferencing. Mobile phone wafer 12 can also be utilized with a PDA 18*g* in much the same way as laptop computer 18*c* and/or desktop computer 18*d* to significantly broaden the usefulness of PDA 18*g* for most users. No longer would a person have to either carry two devices, such as a cellular telephone and a PDA 18*g* that do not easily interface, and have to search out a local network in order to use the PDA 18*g* to access the Internet and other on-line activity. Instead, with the mobile phone wafer 12 connected to or in communication with the PDA 18*g*, the user can easily switch between and interface the telephone functions with the PDA functions. As stated above, mobile phone wafer 12 can also be utilized with a printer 18*h* to send data, messages and other information, including photographs, directly to printer 18*h* for printing. Other peripheral devices 18 suitable for use with wafer mobile phone platform system 10 of the present invention include, but are not limited to, digital tape recorders/players 18*i* and vehicle computer control systems, shown as 18*j* in FIG. 8.

One particular use for wafer mobile phone platform 10 of the present invention is with cordless telephones 18*k*, such as the 900 mHz cordless phone systems designed to be used with voice over Internet protocol (or voice over IP). The Wi-Fi or Bluetooth capability of mobile phone wafer 12 would "power up" cordless telephone 18*k* to allow connection with the user's home or office network. In this manner, the voice over IP would allow the mobile phone wafer 12 to ring through and connect with the cordless handsets used with the voice over ip telephone 18*k*. Preferably, the ring tone for calls from mobile phone wafer 12 would be distinct from the voice over IP ring. The telephone consol base station can have multiple ports for several mobile phone wafers 12 to be docked at one time and a port to allow daisy chaining of several more mobile phone wafers 12 at one time. Each cordless telephone 18*k* could be programmed to ring with only the desired mobile phone wafer 12 or all of them. A computer would receive and store voice mail while no wafer 12 was docked or within range of the base station, which could be an integral part of the wafer mobile phone platform system 10. A higher power (i.e., 3 watt) cellphone antenna can be connected to the base station to enhance reception when used at home or office.

Figure 9:
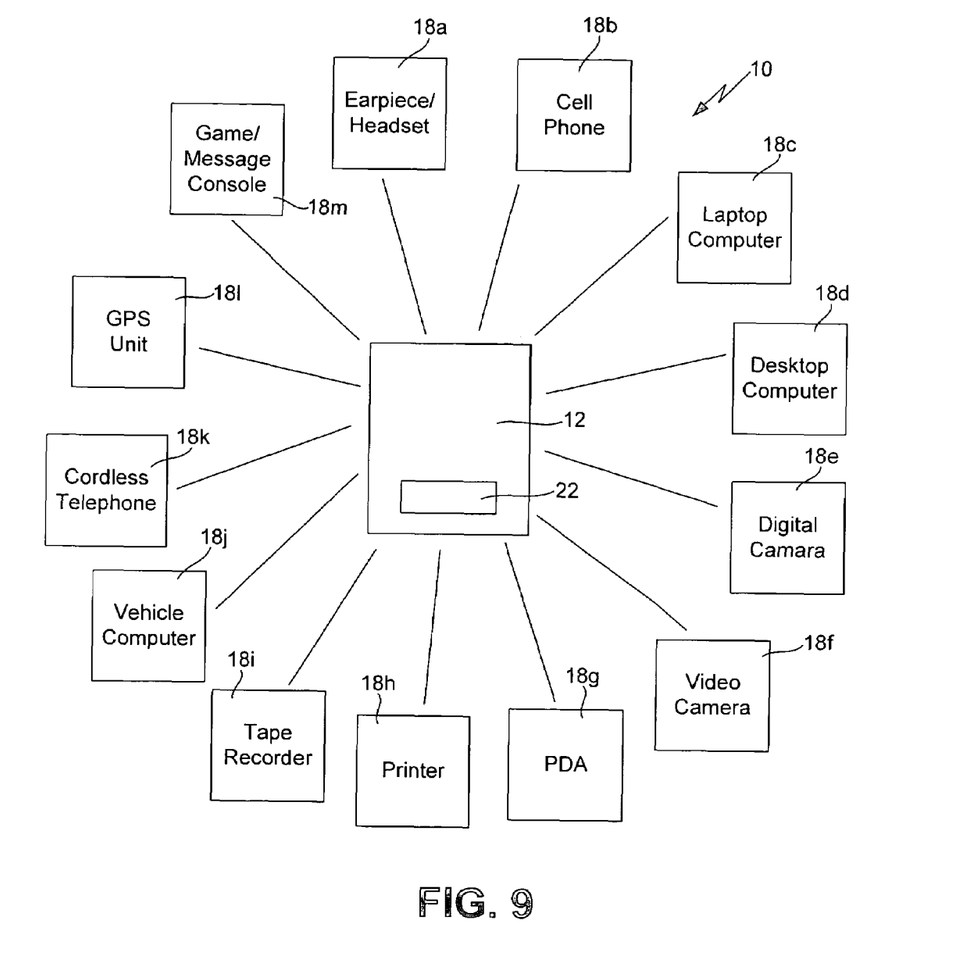
FIG. 9 is a block diagram of the wafer mobile phone platform system of the present invention showing use of the mobile phone wafer with a variety of peripheral devices.

In addition to the above, wafer mobile phone platform 10 of the present invention is adaptable for use with a global positioning system (GPS) device, shown as 18*l* on FIG. 9. As with the other peripheral devices 18, mobile phone wafer 12 can be adapted to be attached to or received in GPS device 18*l* such that the unit functions as a combined global positioning and wireless telephone device. One advantage of such a system is that a person who was lost or otherwise needed to be found, could transmit their location, as determined by the GPS device 18*l*, over a wireless communication network 16 via transceiver unit 14 on mobile phone wafer 12. In yet another configuration, wafer mobile phone platform 10 can be configured to connect or communicate with game and/or text message consoles, shown as 18*m* in FIG. 9. In one embodiment, the user could interact with a text messaging console 18*m* without having to physically sit at or otherwise contact the console 18*m* by utilizing the short range RF capability of mobile phone wafer 12. In this manner, the user could receive his or her text messages quickly and easily virtually anywhere in the world.

In use, the user of wafer mobile phone platform system 10 would utilize mobile phone wafer 12, having transceiver unit 14 and other components, to access and transmit information across wireless communication network 16. In one configuration, mobile phone wafer 12 can be used as a stand alone communication device that serves as a minimalist cellular telephone. A Bluetooth communication device 26 wirelessly connects to a Bluetooth enabled earpiece 18*a* (or headset) that is configured to control the operation of mobile phone wafer 12. When an incoming telephone call is sensed by mobile phone wafer 12, a signal is sent to the earpiece 18*a* that a call is incoming to allow the user to answer the telephone call with a mere touch to the earpiece 18*a*. When the call is finished, the transceiver unit 14 will automatically turn off mobile phone wafer 12. With this system, the user will not have had to touch the mobile phone wafer 12 during the call. Mobile phone wafer 12 stores a quantity of names, phone numbers and other identifying information in the memory storage device 21 so the user can make a telephone call by touching earpiece 18*a*, to activate transceiver unit 14, and by using voice commands (i.e., saying the person's name) cause mobile phone wafer 12 to dial the person's telephone number. On/off switch 24 is used to prevent unintentional telephone calls and to prevent undesired telephone interruptions. When used with other peripheral devices 18, mobile phone wafer 12 can be connected, wired or wirelessly, to the peripheral device 18 to combine the functions of a cellular telephone with the functions of the peripheral device 18. This allows the user to move his or her cellular connection from one peripheral device 18 to another, as desired. For instance, the user could utilize mobile phone wafer 12 stand alone or in cellular phone 18*b* for everyday use and then move it to laptop computer 18*c* when mobile computing is needed or to digital camera 18*d* or digital video camera 18*e* when he or she will want to take some photographs or video and have access to the wireless communication network 16 for telephone calls and transmittal of the photographs or videos. The portability and interchangeability of mobile phone wafer 12 in the wafer mobile phone platform system 10 of the present invention greatly improves the usefulness of both the wireless communication device and the peripheral devices 18 with which it can be utilized.

While there are shown and described herein certain specific alternative forms of the invention, it will be readily apparent to those skilled in the art that the invention is not so limited, but is susceptible to various modifications and rearrangements in design and materials without departing from the spirit and scope of the invention. For instance, it should be noted that the present invention is subject to modification with regard to the dimensional relationships set forth herein and modifications in assembly, materials, size, shape and use. For example, while a universal serial bus has been used in the embodiments of the invention, other buses having a source of power within the bus could also be used. Likewise, while a Bluetooth radio has been used as the RF transceiver in the preferred embodiment, other RF transceivers having a low power transmitter for transmitting over short distances could also be used. Further, while certain peripheral devices have been given as examples of a device suitable for use with the present invention, other devices could also be utilized. Therefore, it is contemplated that the appended claims will cover any such modifications or embodiments as fall within the true scope of the invention.

What is claimed is:

1. A wafer mobile phone platform system for transmitting voice and data over a wireless communication network, said system comprising:

a mobile phone wafer configured to operatively connect to a peripheral device, said peripheral device not otherwise being configured to communicate over said wireless communication network;

a transceiver unit on said mobile phone wafer, said transceiver unit having telephone circuitry and component for connection to said wireless communication network for sending and receiving voice and data communications;

a memory storage device on said mobile phone wafer, said memory storage device connected to said transceiver unit and configured to store data accessible by said transceiver unit;

a battery on said mobile phone wafer, said battery operatively connected to said transceiver unit;

a communication device on said mobile phone wafer, said communication device configured to transmit voice and data communications between said transceiver unit and said peripheral device; and an antenna coupled to said transceiver unit, wherein said wafer mobile phone platform system allows a user to utilize said mobile phone wafer as a stand alone mobile phone for wireless voice communication and convert said peripheral device to use for wireless voice and data communication over said wireless communication network by connecting said mobile phone wafer to said peripheral device so as to interface said transceiver unit and said memory storage device with said peripheral device.

2. The system according to claim 1, wherein said mobile phone wafer is configured to be coupled with said peripheral device.

3. The system according to claim 2, wherein said mobile phone wafer is configured to be docked with or inserted into said peripheral device.

4. The system according to claim 1, wherein said mobile phone wafer further comprises an on/off switch and a display screen operatively connected to said transceiver unit.

5. The system according to claim 1, wherein said peripheral device comprises one of: a cellular phone; an earpiece having a speaker and a microphone; a headset having a speaker and a microphone; a laptop computer; a desktop computer; a digital camera; a video camera; a PDA; a printer; a tape recorder; a cordless telephone; a game/message console; and a GPS unit.

6. The system according to claim 1, wherein said peripheral device is an individual reception device configured to allow a user to interface with said transceiver by voice communication to make and receive telephone calls.

7. The system according to claim 1, wherein said peripheral device is a cellular phone comprising a phone body having a standard twelve key keypad, one or more function keys and a display panel.

8. The system according to claim 1, wherein said communication device comprises a short range radio frequency transceiver.

9. The system according to claim 8, wherein said short range radio frequency transceiver comprises at least one of a Bluetooth module and a Wi-Fi module.

10. The system according to claim 8, wherein said communication device further comprises a headphone jack.

11. The system according to claim 1, wherein said communication device is adaptable for a wired connection to said peripheral device.

12. The system according to claim 11, wherein said wired connection is a USB, serial, parallel or firewire connection.

13. The system according to claim 1, wherein said mobile phone wafer is adaptable for connection to a plurality of peripheral devices and said mobile phone wafer can be operatively connected to said plurality of peripheral devices to interface said transceiver unit with said peripheral devices to allow the user to selectively utilize said peripheral devices for wireless voice and data communication.

14. A wafer mobile phone platform system for transmitting voice and data over a wireless communication network, said system comprising:
a mobile phone wafer configured to operatively connect to a plurality of peripheral devices, said peripheral devices not otherwise being configured to communicate over said wireless communication network;
a transceiver unit on said mobile phone wafer, said transceiver unit having telephone circuitry and component for connection to said wireless communication network for sending and receiving voice and data communications;
a memory storage device on said mobile phone wafer, said memory storage device connected to said transceiver unit and configured to store data accessible by said transceiver unit and said peripheral device;
a battery on said mobile phone wafer, said battery operatively connected to said transceiver unit;
a communication device on said mobile phone wafer, said communication device configured to transmit voice and data communications between said transceiver unit and said plurality of peripheral devices;
a display screen on said mobile phone wafer, said display screen operatively coupled with said transceiver unit; and
an antenna coupled to said transceiver unit,
wherein said wafer mobile phone platform system allows a user to utilize said mobile phone wafer as a stand alone mobile phone for wireless voice communication and selectively convert one of said plurality of peripheral devices to use for wireless voice and data communication over said wireless communication network by connecting said mobile phone wafer to said peripheral device so as to interface said transceiver unit and said memory storage device with said peripheral device.

15. The system according to claim 14, wherein said mobile phone wafer further comprises an on/off switch.

16. The system according to claim 14, wherein said peripheral device comprises one of: a cellular phone; an earpiece having a speaker and a microphone; a headset having a speaker and a microphone; a laptop computer; a desktop computer; a digital camera; a video camera; a PDA; a printer; a tape recorder; a cordless telephone; a game/message console; and a GPS unit.

17. The system according to claim 14, wherein said peripheral device is an individual reception device configured to allow a user to interface with said transceiver by voice communication to make and receive telephone calls.

18. The system according to claim 14, wherein said peripheral device is a cellular phone comprising a phone body having a standard twelve key keypad, one or more function keys and a display panel.

19. The system according to claim 14, wherein said communication device comprises a short range radio frequency transceiver.

20. The system according to claim 19, wherein said short range radio frequency transceiver comprises at least one of a Bluetooth module and a Wi-Ti module.

21. The system according to claim 19, wherein said communication device further comprises a headphone jack.

22. The system according to claim 14, wherein said communication device is adaptable for a wired connection to said peripheral device.

23. The system according to claim 22, wherein said wired connection is a USB, serial, parallel or firewire connection.

24. The system according to claim 14, wherein said mobile phone wafer has an on/off switch operatively connected to said transceiver unit and said communication device is configured for a wired connection to said peripheral device and comprises at least one of a short range radio frequency transceiver and a headphone jack.

25. A wafer mobile phone platform system for transmitting voice and data over a wireless communication network, said system comprising:
a mobile phone wafer configured to operatively connect to a plurality of peripheral devices, said peripheral devices not otherwise being configured to communicate over said wireless communication network;
a transceiver unit on said mobile phone wafer, said transceiver unit having telephone circuitry and component for connection to said wireless communication network for sending and receiving voice and data communications;
a memory storage device on said mobile phone wafer, said memory storage device connected to said transceiver unit and configured to store data accessible by said transceiver unit and said peripheral device;
a battery on said mobile phone wafer, said battery operatively connected to said transceiver unit;
a communication device on said mobile phone wafer, said communication device configured to transmit voice and data communications between said transceiver unit and said plurality of peripheral devices, said communication device comprising a short range radio frequency transceiver;
an individual reception device in communication with said communication device, said individual reception device configured to allow a user to interface with said transceiver by voice communication so as to make and receive telephone calls;

a display screen on said mobile phone wafer, said display screen operatively coupled with said transceiver unit; and an antenna coupled to said transceiver unit, wherein said wafer mobile phone platform system allows a user to utilize said mobile phone wafer as a stand alone mobile phone for wireless voice communication and selectively convert one of said plurality of peripheral devices to use for wireless voice and data communication over said wireless communication network by connecting said mobile phone wafer to said peripheral device so as to interface said transceiver unit and said memory storage device with said peripheral device.

26. The system according to claim 25, wherein said peripheral device is a cellular phone comprising a phone body having a standard twelve key keypad, one or more function keys and a display panel.

27. The system according to claim 25, wherein said communication device further comprises a headphone jack.

28. The system according to claim 25, wherein said short range radio frequency transceiver comprises at least one of a Bluetooth module and a Wi-Fi module.

29. The system according to claim 28, wherein said communication device further comprises a headphone jack.

30. The system according to claim 29, wherein said communication device is configured for a wired connection to said peripheral device.

31. The system according to claim 30, wherein said wired connection is a USB, serial, parallel or firewire connection.

32. The system according to claim 25, wherein said wherein said communication device is configured for a wired connection to said peripheral device.

* * * * *